United States Patent
Boyer

(10) Patent No.: US 9,015,105 B2
(45) Date of Patent: *Apr. 21, 2015

(54) DECLARATIVE SCHEMA-DIRECTED DATA MODEL MANAGEMENT

(75) Inventor: John M. Boyer, Victoria (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/455,310

(22) Filed: Apr. 25, 2012

(65) Prior Publication Data

US 2013/0091179 A1    Apr. 11, 2013

Related U.S. Application Data

(63) Continuation of application No. 13/269,836, filed on Oct. 10, 2011.

(51) Int. Cl.
*G06F 17/30* (2006.01)
*G06F 15/16* (2006.01)
*G06F 17/22* (2006.01)
*G06F 17/24* (2006.01)

(52) U.S. Cl.
CPC .......... *G06F 17/2247* (2013.01); *G06F 17/243* (2013.01)

(58) Field of Classification Search
CPC ... G06F 17/30908; G06F 17/22; G06F 17/24; G06F 17/243
USPC ........... 707/602, 649, 758; 715/760; 709/228, 709/229, 246
See application file for complete search history.

(56) References Cited

U.S. PATENT DOCUMENTS

| | | | |
|---|---|---|---|
| 7,526,491 B2 | 4/2009 | Bass et al. | |
| 7,721,193 B2 | 5/2010 | Upton | |
| 7,761,590 B2 | 7/2010 | Koskimies | |
| 2006/0129918 A1 | 6/2006 | Jeon et al. | |
| 2006/0130051 A1 | 6/2006 | Sanielevici et al. | |
| 2007/0226637 A1 | 9/2007 | Yaseen et al. | |
| 2008/0215733 A1* | 9/2008 | Paul et al. | 709/225 |
| 2009/0100087 A1 | 4/2009 | Connell et al. | |
| 2010/0023531 A1 | 1/2010 | Brisebois et al. | |

OTHER PUBLICATIONS

R. Steele, et al.; "Mobile Web Services Discovery and Invoation Through Auto-Generation of Abstract Multimodal Interface"; Proceedings of the International Conference on Information Technology: Coding and Computing (ITCC '05); vol. 2; p. 35-41; 2005.

(Continued)

*Primary Examiner* — Vincent F Boccio
(74) *Attorney, Agent, or Firm* — Cantor Colburn LLP; Edward Choi

(57) ABSTRACT

A form is received and loaded. It is determined if a schema structure definition defines one or more choice elements for data of the form. A data structure is created for the data. The data structure includes both a schema structure valid component and a non-validated component. When a user selects one of the choice elements, a first set of zero or more data elements corresponding to the selected choice element are loaded into the schema structure valid component of the data structure. The previous set of zero or more data elements and values associated with the previous set of data elements are then stored in the non-validated component of the data structure.

10 Claims, 5 Drawing Sheets

(56) References Cited

OTHER PUBLICATIONS

J. van Zyl, et al.; "Integrity for fom-based input: Towards an XML Schema based approach"; ISSA 2003 Conference; p. 1-17, 2003.
Search Report for GB1217654.1, mailed Jan. 31, 2013, 7 pages.
Kyong-Ho Lee, et al.: Web Services, 2007. ICWS 2007. IEEE International Conference on: Issue Date: Jul. 9-13, 2007 on pp. 856-863 Location.
T.V.Raman: X Forms XML Powered Web Forms; 1.2 A Simple Web Application; Addison-Wesley Professional; Boston, MA 2004; pp. 6-10.
Boyer, et al.,: "Interactive web documents. Computer Science-Research and Development", 2012, vol. 27 2; pp. 127-145.
Lee, et al.: "Contents Adaptation of XForms Pages Using XPath Filtering"; International Conference on Advanced Language Processing and Web Information Technology; 978-0-7695-3273; Aug. 2008; IEEE; pp. 6.
Song, et al.:, "An Automated Generation of XForms Interfaces for Web Service"; International Conference on Web Service; 0-7695-2924-0; IEEE; 2007; pp. 8.

* cited by examiner

DECLARATIVE SCHEMA-DIRECTED DATA MODEL MANAGEMENT

CROSS-REFERENCE TO RELATED APPLICATION

This application is a continuation of U.S. patent application Ser. No. 13/269,836, filed Oct. 10, 2011, the disclosure of which is incorporated by reference herein in its entirety.

BACKGROUND

This invention relates generally to processing within a computing environment, and more particularly to declarative schema-directed data model management.

Web applications typically use forms to collect data and store that data in a database. Extensible markup language (XML) is often used to store and transmit data to and from web applications. Through the use of an XML schema, data within an XML document may be validated. Web applications that collect XML data can be designed to be conformant to an XML schema. The XML Schema often has optional subtree elements or a choice of alternative subtree elements.

One example is that of a payment detail component of a transaction data definition. A "payment" element may include a first sub-element for a "payment type" such as collect on delivery (COD), credit card, bank direct payment card, etc. These payment detail element choices would allow storage of a customer ID for COD or card number, expiry and other info for credit card, etc. According to the XML schema, the payment element of the XML document is not considered valid if payment detail elements corresponding to both the COD and credit card options appeared within it.

Managing these choice and optional nodes creates a compromise between server side manipulation of data, and the removal of data leading to an inconsistent user experience on the client side. Both approaches lead to additional development work, additional maintenance and/or negative customer experience impact.

BRIEF SUMMARY

An embodiment includes a method for declarative schema-directed data model management. A form is received and loaded. It is determined if a schema structure definition defines one or more choice elements for data of the form. A data structure is created for the data, the data structure includes both a schema structure valid component and a non-validated component. When a user selects one of the choice elements, a first set of zero or more data elements corresponding to the selected choice element are loaded into the schema structure valid component of the data structure. The previous set of zero or more data elements and values associated with the previous set of data elements are then stored in the non-validated component of the data structure.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
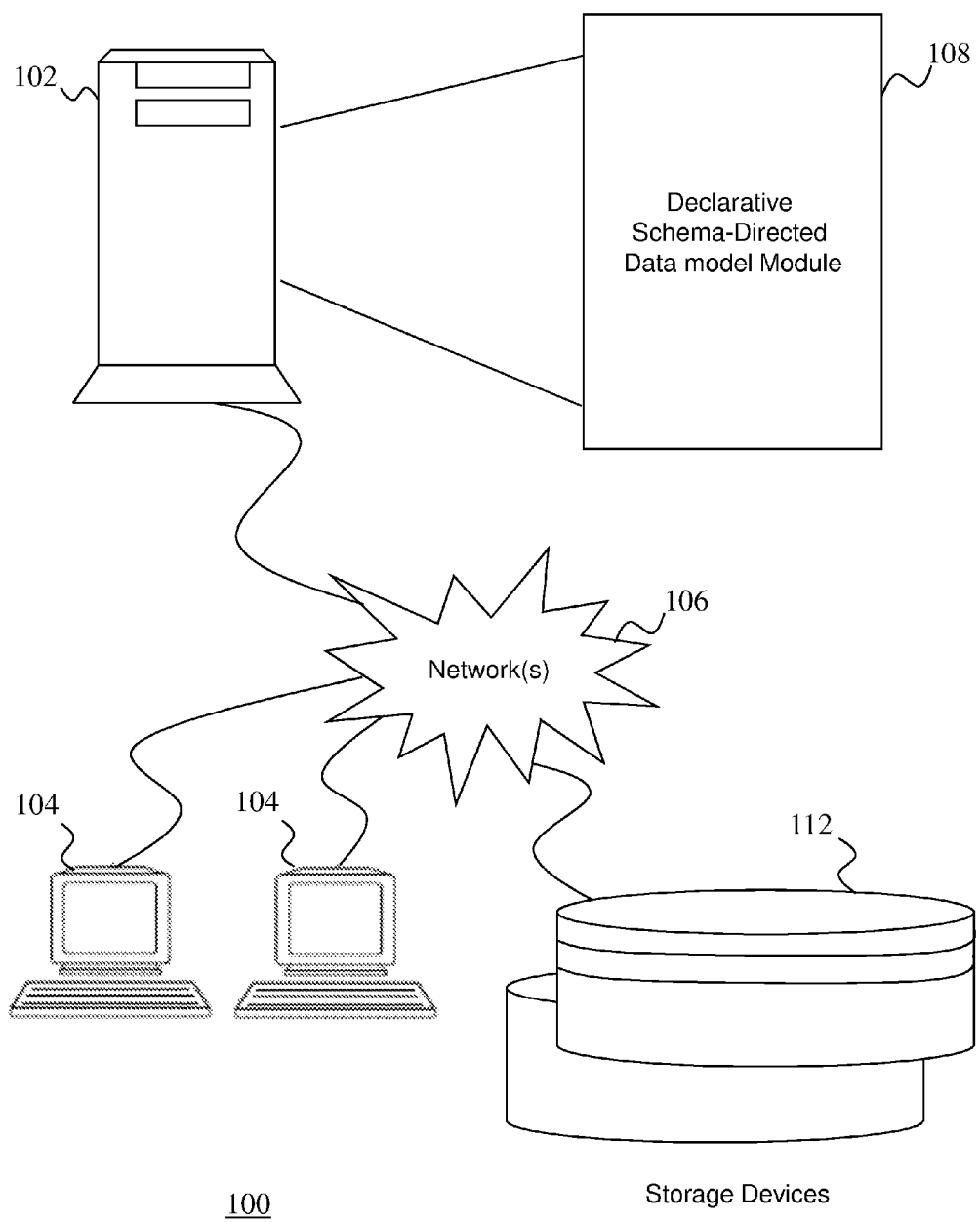
FIG. 1 depicts a schematic diagram of a system for declarative schema-directed data model management that may be implemented in an embodiment.

An embodiment of the present invention provides for declarative schema-directed data model management. In an embodiment, the live XML document representing the web application form data is maintained as a valid XML document per the schema. The XML schema document is scanned to determine if there are any choice data elements (i.e., data elements where a user must select one and only one option from a list of options.) The choice data elements create varying data requirements depending on which choice the user selects. If any choice elements are found in the XML schema, all of the various trees are created for each permutation of valid options. As a user makes a selection, the choice node of the XML tree related to that choice is pruned, and the XML tree related to the selected choice is placed in the XML document in its place. The pruned tree is then stored with all of its values intact. If the user reselects the pruned version, the current XML tree related to the choice is pruned, and the old XML tree is replaced including the data that the user previously selected. The user experience is therefore enhanced, while the XML document's data integrity and validity is maintained.

In an embodiment, when the form is submitted, only the XML tree related to the last selected choice is stored in the database. When a user retrieves the form once more, the data is extracted from the database, and the other XML tree choice options are created and hidden from the user. The user is then allowed to change choice options without issue.

In current practice, an XML document must be created that contains all possible choices of payment details in order to enable user interface controls to easily bind to them and provide values. Then, XML relevant rules are used on each of the payment detail child elements to help indicate which payment detail elements are relevant and which are non-relevant based on the payment type selected by the user. The resulting form is functional, but there are two problems. The data instance within the form is not schema valid, therefore validating the whole form document using the data schema for those elements in the data schema's namespace is not possible because the extra elements in the XML document violate the XML schema. In addition, if the whole document is submitted to the server, extracting the data instance within it produces XML data that is not schema valid. The server side must therefore be able to prune the non-relevant nodes, which imposes a significant processing burden on the server side.

An additional way to handle choices and optional fields in a web application is, stripping the non-relevant payment detail elements automatically from the data before it is submitted. This provides a schema valid data instance to the server, but that data instance can never again be used in the same form to drive further client-side interactivity in a later interaction session because the non-relevant payment detail child elements have been physically removed. Relevance pruning is supposed to be the last act of a completed transaction. But once a subtree is physically removed, it cannot become relevant later, if for example a user wishes to change the payment type, they cannot because a subtree must exist in the data in order to change from non-relevant to relevant.

As an alternative, it would be possible to use several features of a language such as XForms language to construct a template-based solution. By, for example, creating instance data templates for optional and choice element subtrees, and then when a user makes a data setting that changes an optional element from shouldn't exist to one that should exist, inserting the element from the template into the document. When the user makes a data setting that changes an optional element from what should exist to one that shouldn't exist, the element is deleted from live instance data. Another option is when the user makes a data setting that changes a choice from one subelement to another, then the unwanted subelement is deleted and the desired subelement is inserted in its place.

There are two problems with this approach. First, it is based on manually constructing an event-drive imperative solution, which is analogous to the existing solution to the problem prior to the XML implementation. In addition, this latter solution is template-based. Therefore, if a user makes choice 1 corresponding to subtree A, then fills in part of subtree A, then changes their mind to choice 2 corresponding to subtree B, then subtree A is delete and the data filled into it is lost. This is a usability problem in the human interaction domain if the user decides choice 2 was a mistake and tries to return to choice 1. Subtree A comes back, but it is the empty template A.

Turning now to FIG. 1, a system 100 for implementing declarative schema-directed data model management will now be described. In an embodiment, the system 100 includes a host system computer 102 executing computer instructions for declarative schema-directed data model management. Host system computer 102 may operate in any type of environment that is capable of executing a software application. Host system computer 102 may comprise a high-speed computer processing device, such as a mainframe computer, to manage the volume of operations governed by an entity for which the declarative schema-directed data model management is executing. In an embodiment, the host system computer 102 is part of an enterprise (e.g., a commercial business) that implements the declarative schema-directed data model management.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the declarative schema-directed data model management described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of declarative schema-directed data model management. Alternatively, a separate storage device (e.g., storage device 112) may be implemented for this purpose.

In an embodiment, the storage device 112 includes a data repository with data relating to declarative schema-directed data model management by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an embodiment, the storage device 112 includes one or more databases containing, e.g., declarative schema-directed data model management data, code and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the declarative schema-directed data model management. The host system computer 102 includes a declarative schema-directed data model management module 108. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the declarative schema-directed data model management described in FIG. 1 may be implemented in hardware, software executing on a general purpose computer, or a combination thereof.

Figure 2:
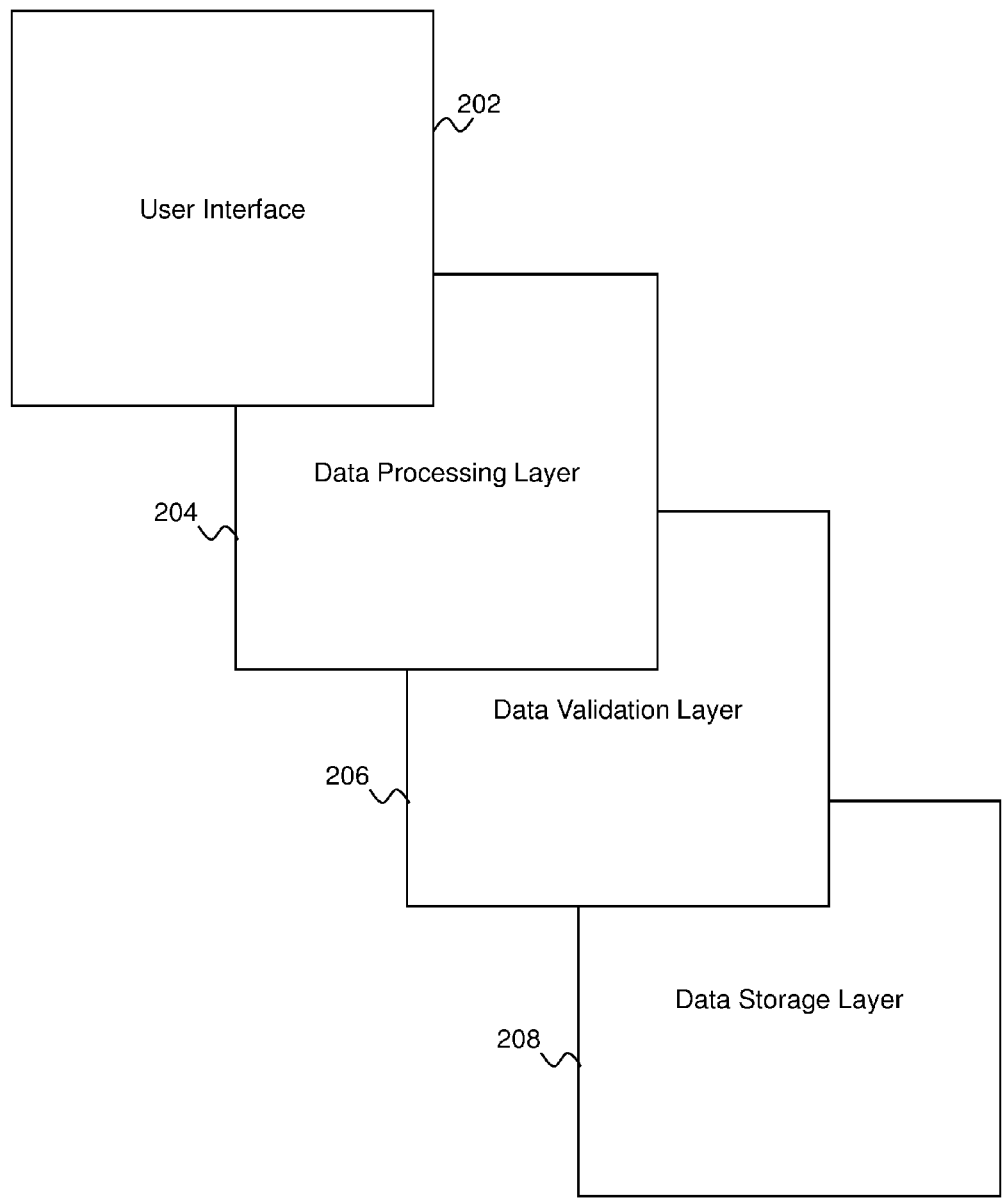
FIG. 2 depicts a schematic diagram of a data and user interface abstraction in an embodiment.

FIG. 2 is a schematic diagram of a data and user interface abstraction in an embodiment. In an embodiment the components that make up the data and user interface abstraction of FIG. 2 are executed in the system of FIG. 1. The user interface layer 202 includes logic for display text, forms and form data on, for example, a web browser. The user interface layer 202 provides controls for making selections, such as form selections via controls (i.e., a radio button, dropdown, etc.) and for submitting the forms. In an embodiment, as data is modified at the user interface layer 202, the changes to the data are sent to a data processing layer 204. The data processing layer 204 processes the changes to the data, including the manipulation of the data elements when a choice is selected in the user interface layer 202 as will be described in more detail below. The data is validated against validation rules (i.e., an XML schema) at a data validation layer 206. In an embodiment, the data validation layer 206 validates the correctness of the data elements, and/or tests the validity of the data container (i.e., an XML document). Valid data is then saved to a data storage layer 208 (such as a database).

Figure 3:
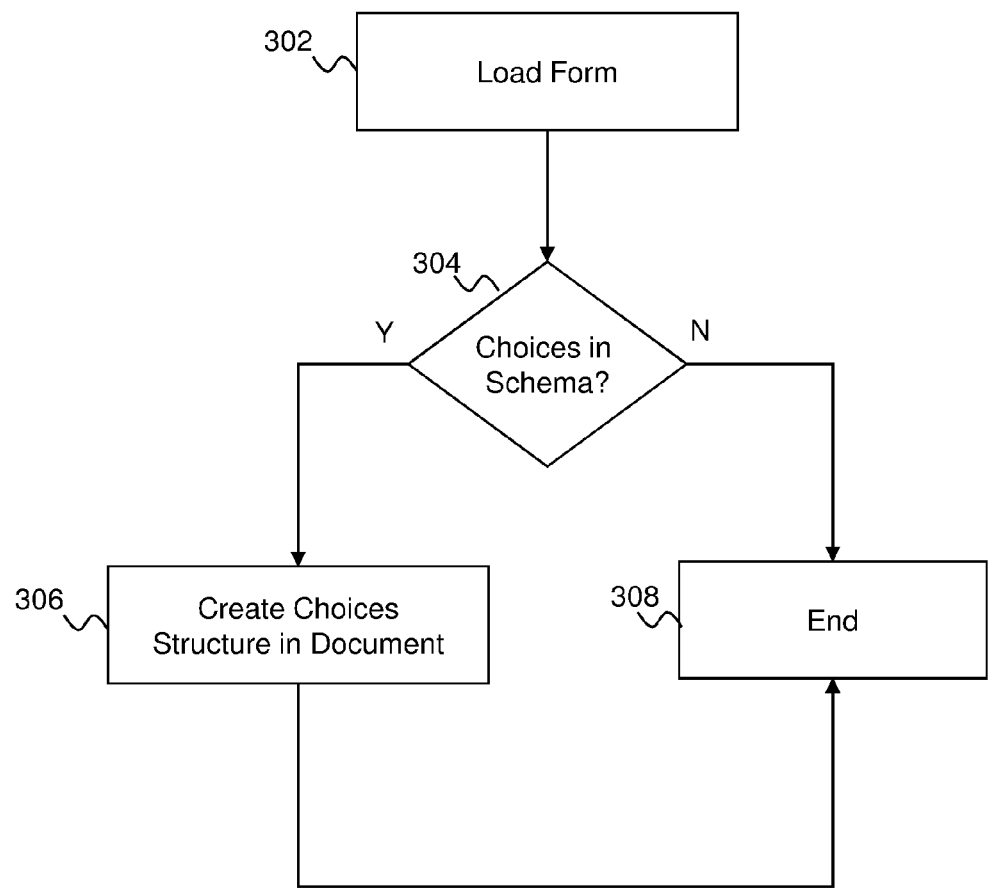
FIG. 3 depicts a process flow that may implemented by a declarative schema-directed data model management module for initializing a form in an embodiment.

FIG. 3 depicts a process flow that may implemented by a declarative schema-directed data model management module for initializing a form in an embodiment. In an embodiment, the process flow of FIG. 3 is performed by the declarative schema-directed data model management module 108 of FIG. 1. At block 302, a form is loaded. In an embodiment, the form is a web form that is loaded in a browser. At block 304, the XML schema structure definition is reviewed and it is determined if the XML schema contains any choice fields.

Choice fields represent multiple options in a form, wherein each of the options corresponds with a particular set of data fields. Only a single option may be selected at a time, and the form's main data structure must only contain the data fields associated with the selected option in order to be considered valid. As a result, as a user of a form chooses an option, the underlying data structure is changed to accommodate the fields associated with the selected option. The main data structure is created based on a schema document that corresponds with the form that has been loaded, and is created to include only the selected options of the choice fields. In an embodiment, the unselected options are stored as orphan data objects, with all of their data and attributes maintained. In an embodiment, the form's main data structure is an XML document, and the schema document is at least one XML schema document.

If there are no choice fields in the XML schema, then processing ends at block 308. If there are choice fields in the XML schema, then processing continues at block 306. At block 306, a composite data structure is created to contain the data for the form. In an embodiment, the data structure includes a main data structure component that is schema structure valid (i.e. it conforms to the schema structure definition) and a second non-validated component for housing the orphaned data objects corresponding to all of unselected options of all the choice fields defined in the schema. Once the choice data structures have been created the form load is complete and processing ends at block 308.

Figure 4:
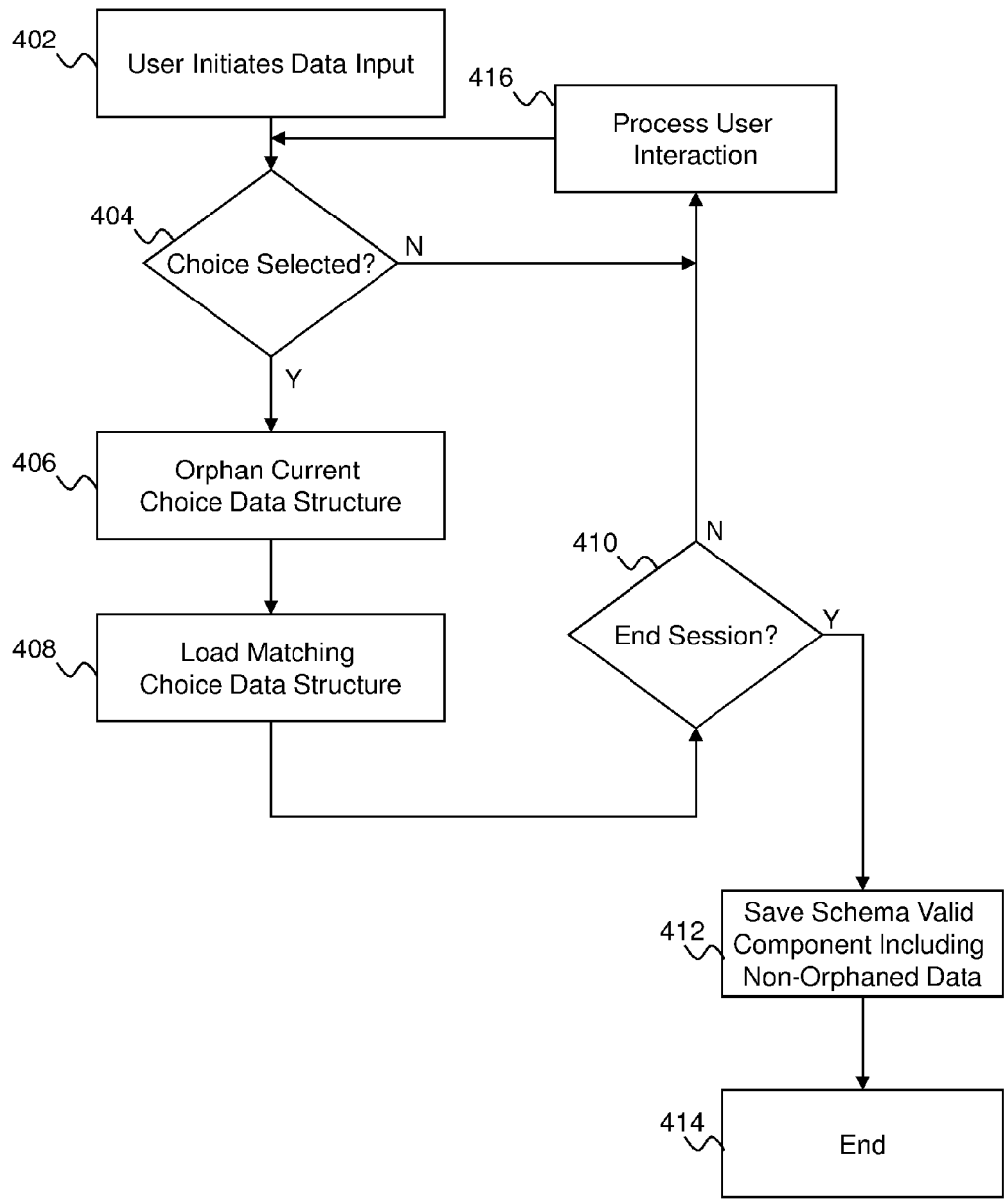
FIG. 4 depicts a process flow that may implemented by a declarative schema-directed data model management module for processing user input in an embodiment.

FIG. 4 depicts a process flow that may implemented by a declarative schema-directed data model management module for processing user input in an embodiment. In an embodiment, the process flow of FIG. 4 is performed by the declarative schema-directed data model management module 108 of FIG. 1. At block 402, a user initiates input into the loaded formed, such as the form loaded at FIG. 3. At block 404, it is determined if an option in the form is selected by the user. If a user has selected an option, then processing continues at block 406.

At block 406, the current data structure for a choice is orphaned (i.e., pruned from the main data structure) and is stored in the non-validated component of the composite data structure. In an embodiment, the orphaned components are only stored in the non-validated component in an optimized fashion, i.e. only when the user is presented with portion of the user interface that allows them to make a choice. In an embodiment, with large multipage forms, only some of the form user interface is presented at any one time. Therefore only when presenting a particular page are the non-validated components, and the orphaned components created.

At block 408, the orphan data object associated with the selected choice is retrieved from the location where it has been stored, and is added to the main data structure, i.e. in the schema structure valid component, where the previous choice data structure was removed.

At block 410, it is determined if the user has requested that the data entry session be ended. If the user selects to end the session, processing continues at block 412. At block 412, the schema structure valid component including non-orphaned data is saved in some application-specific way. In and embodiment, the schema structure valid component may be transmitted over the network 106 and stored in the database (i.e. placed in the storage device 112.) Alternately, the schema structure valid component may be indirectly saved by storing it in the original form and transmitting the updated form for storage in a document management repository. Alternately, the schema structure valid component may alternately be saved in a more sophisticated manner, such as in the working memory of web application code equipped to extract data values from the schema structure valid component for subsequent use in business process steps, business transactions or database operations. At block 414, processing ends. Returning to block 410, if the user has not requested to end the session, then processing continues at block 416, where the user's interaction with the form is processed normally. Processing then continues at block 404. Returning to block 404, if it is determined that a user did not select an option, then processing continues at block 416, where the user's interaction with the form is processed normally. Processing then continues at block 404.

Figure 5:
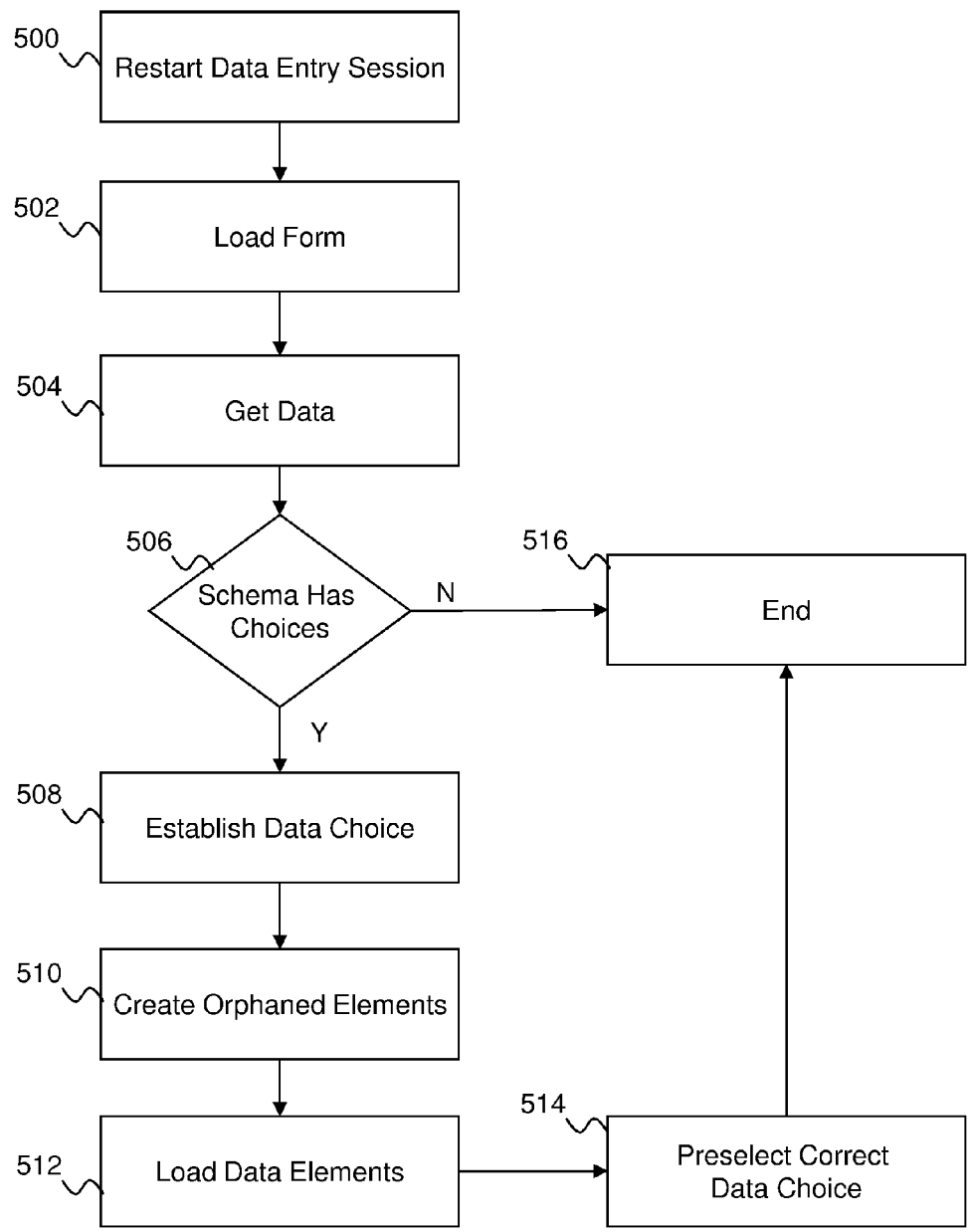
FIG. 5 depicts a process flow for reloading a form once a session has been saved in an embodiment.

FIG. 5 depicts a process flow for reloading a form once a session has been saved in an embodiment. In an embodiment, the process flow of FIG. 5 is performed by the declarative schema-directed data model management module 108 of FIG. 1. At block 500, a request is received to restart a data entry session. In an embodiment, data entry is performed in sessions, and as stated above when a session is completed the orphaned elements are pruned from the data structure and the selected data are stored. A user may restart a data entry session in order to make changes to the selected data. At block 502, the form is loaded at the browser. At block 504, data is retrieved from the database, such as a database in the storage device 112 of FIG. 1. At block 506, the XML schema associated with the form is reviewed and it is determined if the XML schema contains any choice fields. If the XML schema has no choice fields, then processing ends at block 516.

Otherwise, if the XML schema does have choice fields, then processing continues at block 508. At block 508, it is determined, based on the data, which choice was previously selected. In an embodiment, the data contains a specific indicator of which choice was selected. At block 510, orphaned data elements are created for any of the choices that were not the selected choice. At block 512, the data elements are loaded onto the form. At block 514, the choice that was previously selected is preselected on the form. At block 516, processing ends.

Although the embodiments describe the use of XML schemas, it will be understood that in other embodiments the various flows and systems may be used in conjunction with any other validation scheme (i.e. rules, business objects, etc.) that support the use of optional and/or multi-choice form values.

Technical effects and benefits include the ability to retain and repopulate multi-choice data in a form, as a user of the form changes selections, while maintaining a valid intermediate data structure. An additional benefit is the ability to recreate the various options in a form once the session has ended, and the orphaned data elements are pruned from the document.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for declarative schema-directed data model management, the method comprising:
    loading a form that includes data;
    determining whether a schema structure definition for the data of the form defines one or more choice elements;
    creating a first data structure based on the schema structure definition to contain the data when the schema structure definition for the data of the form includes the one or more choice elements, the first data structure comprising a schema structure valid component and a non-validated component;
    responsive to a user input selecting one of the choice elements,
        pruning from the first data structure data orphaned objects associated with the selected choice element,
        storing the orphaned objects in a non-validated component of a second data structure,
        loading the orphaned objects into the schema structure valid component of the first data structure.

2. The method of claim 1, wherein the schema structure valid component of the first data structure is an XML document.

3. The method of claim 1, wherein the schema structure definition is provided by at least one XML schema document.

4. The method of claim 1, wherein the non-validated component is a metadata location in an XML document.

5. The method of claim 1, wherein the non-validated component is created in an optimized fashion.

6. The method of claim 1, the method further comprising:
    receiving a request to end a data entry session, and
    saving the schema structure valid component of the data structure to a data storage layer, responsive to receive the request to end the data entry session.

7. The method of claim 1, wherein the data of the corm comprises a schema structure valid component previously saved to a data storage layer.

8. The method of claim 1, wherein each choice element represents multiple options in the form, each of the multiple options corresponds with a particular set of data fields, each data field stores one or more data objects that are pruned upon selection of the corresponding choice element.

9. The method of claim 1, wherein the first data structure is a main data structure and the second data structure is a composite data structure.

10. The method of claim 1, wherein the form is a web form loaded in a browser.

* * * * *